June 15, 1965  A. C. MAGUIRE  3,188,803
JET ENGINES
Filed July 27, 1962  3 Sheets-Sheet 1
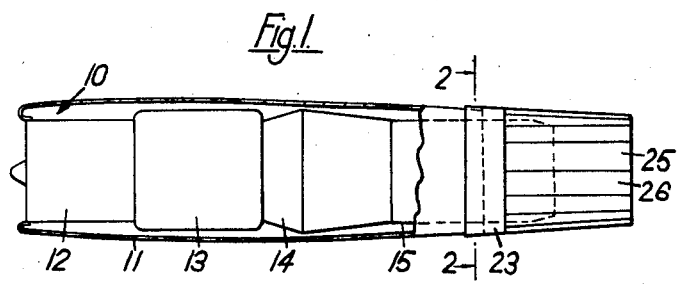
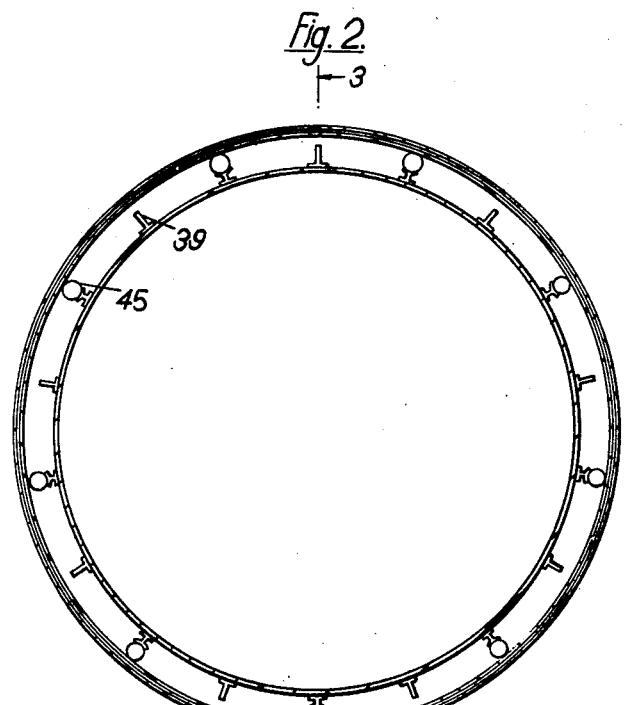
Inventor
Addison Charles Maguire
By
Fred E. Shoemaker
Fred L. Witherspoon, Attorneys

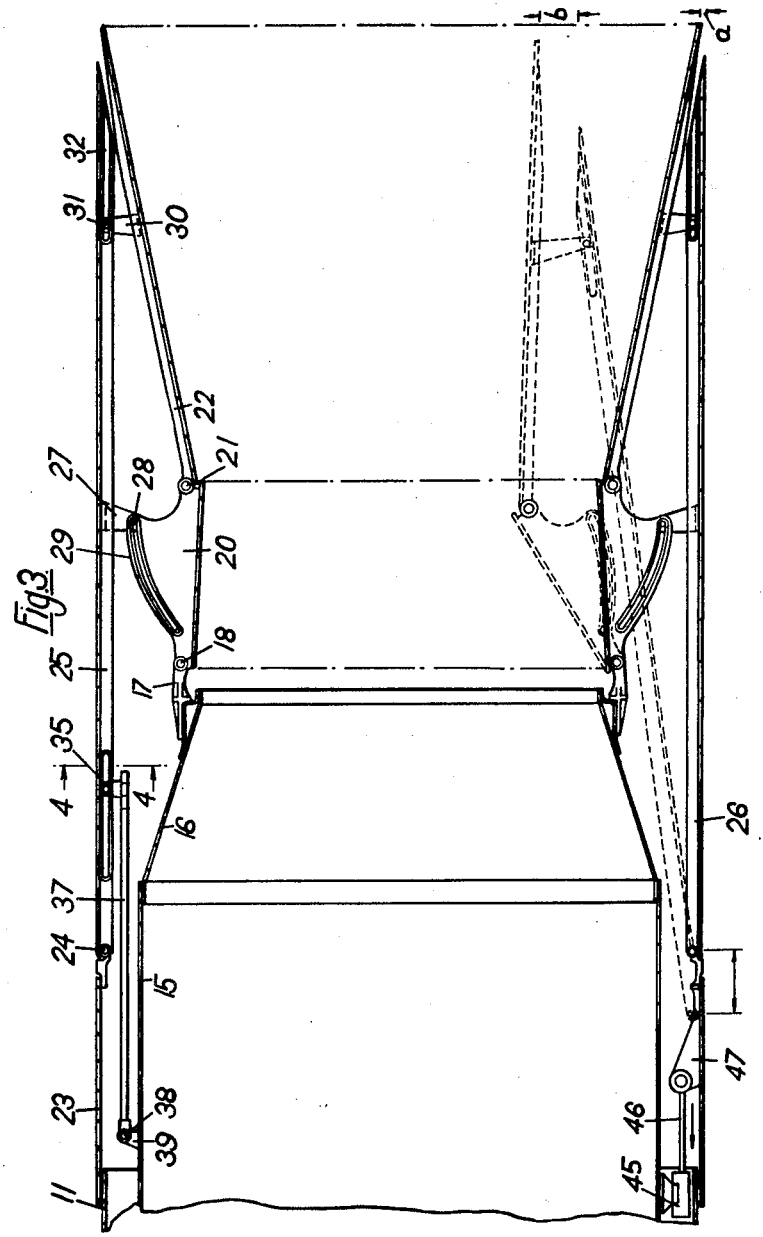

June 15, 1965  A. C. MAGUIRE  3,188,803
JET ENGINES
Filed July 27, 1962  3 Sheets-Sheet 3
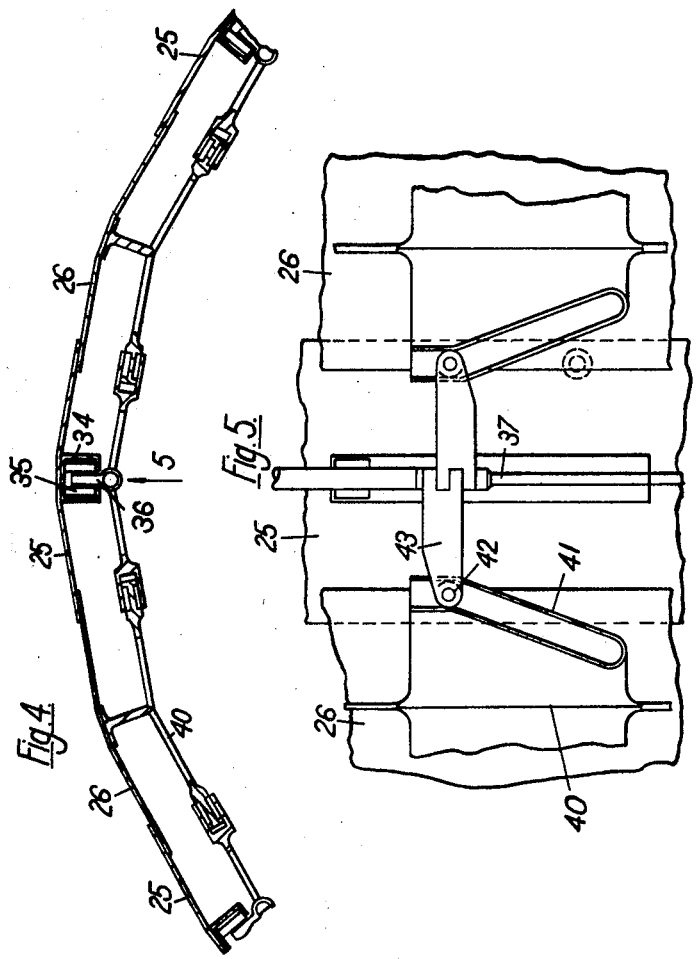
Inventor
Addison Charles Maguire
By
Fred. E. Shoemaker
Fred P. Witherspoon Jr. Attorneys 3,188,803
JET ENGINES
Addison Charles Maguire, Derby, England, assignor to Rolls-Royce Limited, Derby, England, a company of Great Britain
Filed July 27, 1962, Ser. No. 212,813
Claims priority, application Great Britain, July 28, 1961, 27,553/61
7 Claims. (Cl. 60—35.6)

This invention concerns jet engines which are provided with convergent-divergent nozzles.

According to the present invention, there is provided a jet engine provided with a convergent-divergent nozzle, said nozzle comprising an assembly of nozzle members which may be moved to vary the size of the throat of the nozzle, such movement of the nozzle members involving radial movement of their downstream ends, an assembly of radially movable casing members within which the said nozzle members are mounted, and means for ensuring that radially inward and outward movement of the downstream ends of the nozzle members is respectively accompanied by radially inward and outward movement of the casing members.

The invention enables any gap between the downstream ends of the nozzle members and casing members to be reduced. This is desirable since the gap will otherwise constitute a dead zone which will give rise to turbulence and base drag.

The said casing members may, for example, form the downstream part of a nacelle or pod within which the engine is mounted.

Preferably the assemblies of nozzle members and casing members are connected together by linkage means, power means being provided for effecting movement of one of said assemblies. The said power means preferably effects radial movement of the casing members.

Preferably the casing members are constituted by pivotally mounted flap members which are arranged to be moved axially by said power means, cam means being provided for camming said casing members towards and away from each other on axial movement of the casing members in an upstream and in a downstream direction respectively.

The invention is illustrated, merely by way of example, in the accompanying drawings, in which:

FIGURE 1 is an elevation of a gas turbine engine according to the present invention, FIGURE 2 is a section taken on the line 2—2 of FIGURE 1, FIGURE 3 is a broken away section taken on the line 3—3 of FIGURE 2, FIGURE 4 is a broken away section taken on the line 4—4 of FIGURE 3, and FIGURE 5 is a broken away underneath plan view looking in the direction of the arrow 5 of FIGURE 4.

The terms "left" and "right" as used in the description below, are to be understood to refer to directions as seen in the drawings.

Referring to the drawings, a gas turbine forward propulsion jet engine 10 for use on a supersonic aircraft is mounted within a nacelle 11.

The engine 10 comprises a compressor 12, combustion equipment 13 and turbine 14, the turbine exhaust gases flowing through a jet pipe 15.

At its downstream end the jet pipe 15 has a convergent frusto-conical portion 16 (FIG. 3). Mounted at the downstream end of the frusto-conical portion 16, (FIG. 3) is an annular support member 17, the latter being provided with pivots 18 on which are mounted an annular assembly of nozzle members 20.

Each nozzle member 20 is provided at its downstream end with a pivot 21 on which is mounted a nozzle member 22.

As will be seen from FIGURE 3, the portion 16 and assemblies of nozzle members 20, 22, together constitute a convergent-divergent nozzle.

The nacelle 11 has an axially movable portion 23 at the downstream end of which there are pivots 24 on which are mounted an annular assembly of casing members 25, 26. The casing members 25, 26 extend almost to the downstream end of the nozzle members 22 and alternate with each other.

Each of the casing members 25, 26 carries a radially inwardly extending strut 27 whose radially inner end has rollers 28 which are movable in a track 29 provided in the respective nozzle member 20. Each of the nozzle members 22 is provided with a radially outwardly extending strut 30 at whose radially outer end there are provided rollers 31 which are movable in a track 32 of the respective casing member 25 or 26.

Each of the casing members 25 is provided on its inner surface with a track 34. A pair of rollers 35 is slidable in each of the tracks 34 and is carried by a radial arm 36. The arm 36 is secured to an axially extending rod 37 which is pivotally mounted at 38 on a bracket 39 carried by the jet pipe 15.

Each of the casing members 26 is provided internally with a plate member 40 each of whose opposite sides is provided with a cam track 41. A roller 42 is movable in each of the cam tracks 41 and is carried by an arm 43 connected to the rod 37.

Each of a plurality of angularly spaced apart hydraulic (or pneumatic) cylinders 45 has a rod 46 which is connected to a bracket 47 on the nacelle portion 23.

When it is required to move the nozzle members 22 from the full line position shown in FIGURE 3 to the dotted line position thereof, whereby to decrease the size of the throat of the convergent-divergent nozzle, the hydraulic cylinders 45 are actuated so as to move the portion 23 towards the left. This causes the rollers 42 to move in the tracks 41 so as to cam the casing members 25, 26 radially inwardly towards each other. The radial inward movement of the casing members 25, 26, is, by reason of the linkage provided by the struts 27, 30, transmitted to the nozzle members 22 so as to cause radial inward movement of the latter.

Similarly, when it is required to move the nozzle members 22 from the dotted line to the full line position, the hydraulic cylinders 45 are actuated to move the portion 23 towards the right.

It will be noted that when the parts are in the full line position shown in FIGURE 3, the annular gap $a$ between the assemblies of nozzle members 22 and casing members 25, 26 is very small indeed. When the parts are in the dotted line position, the annular gap $b$ between the said assemblies, although larger than the gap $a$, is still small.

The gaps $a$, $b$ constitute dead zones which may give rise to base drag and it will therefore be appreciated that the invention is of value in minimising such base drag.

I claim:
1. A jet engine provided with a convergent-divergent nozzle, said nozzle comprising an assembly of longitudinally extending nozzle members, each being formed by member sections hinged together intermediate the length thereof and which may be moved in overlapping relationship to vary the size of the throat of the nozzle, such movement of the nozzle members involving radial movement of the downstream ends of each section, an assembly of radially movable casing members pivotally mounted at their upstream ends and within which the said nozzle members are mounted, linkage means connecting the assemblies of nozzle members and casing members together, whereby radially inward and outward movement of the downstream ends of the casing members is respectively accompanied by radially inward and outward movement of the nozzle members, power means for effecting axial movement of the casing members, and cam means for moving said casing members towards and away from each other on axial movement of the casing members in an upstream and in a downstream direction respectively.

2. A jet engine provided with a convergent-divergent nozzle, said nozzle comprising an assembly of longitudinally disposed nozzle members, each being formed by member sections hinged together intermediate the length thereof and which may be moved in overlying relationship to vary the size of the throat of the nozzle, such movement of the nozzle members involving radial movement of the downstream ends of each section, a ring, an assembly of radially movable casing members pivotally mounted at their upstream ends to said nacelle ring and within which the said nozzle members are mounted, said casing members forming the downstream part of the nacelle, linkage means connecting the assemblies of nozzle members and casing members together, whereby radially inward and outward movement of the downstream ends of the casing members is respectively accompanied by radially inward and outward movement of the nozzle members, power means for effecting axial movement of the nacelle ring and casing members, and cam means for camming said casing members towards and away from each other on axial movement of the casing members in an upstream and in a downstream direction respectively.

3. A jet engine provided with a convergent-divergent nozzle, a jet pipe, an assembly of upstream and downstream nozzle members which may be moved to vary the size of the throat of the nozzle, such movement of the nozzle members involving radial movement of the downstream ends of the downstream nozzle members, said upstream and downstream nozzle members being pivotally connected together at their downstream and upstream ends respectively, said upstream nozzle members being pivotally connected to the downstream end of said jet pipe, an assembly of radially movable pivotally mounted casing members within which the said nozzle members are mounted, track and roller connections between the assemblies of nozzle members and casing members, whereby radially inward and outward movement of the downstream ends of the casing members is respectively accompanied by radially inward and outward movement of the nozzle members, and whereby axial movement of said casing members relative to said nozzle members is accommodated, power means for effecting axial movement of the casing members relative to the nozzle members, and cam means for moving said casing members towards and away from each other on axial movement of the casing members in an upstream and downstream direction respectively.

4. A jet engine provided with a convergent-divergent nozzle, a jet pipe, an assembly of upstream and downstream nozzle members which may be moved to vary the size of the throat of the nozzle, such movement of the nozzle members involving radial movement of the downstream ends of the downstream nozzle members, said upstream and downstream nozzle members being pivotally connected together at their downstream and upstream ends respectively, said upstream nozzle members being pivotally connected to the downstream end of said jet pipe, an assembly of radially movable pivotally mounted casing members within which the said nozzle members are mounted, track and roller connections between said upstream nozzle members and said casing members and between said downstream nozzle members and said casing members, whereby radially inward and outward movement of the downstream ends of the nozzle members is respectively accompanied by radially inward and outward movement of the casing members, and whereby axial movement of said casing members relative to said nozzle members is accommodated, power means for effecting axial movement of the casing members relative to the nozzle members, and cam means for moving said casing members towards and away from each other on axial movement of the casing members in an upstream and downstream direction respectively.

5. A jet engine provided with a convergent-divergent nozzle, a jet pipe, an assembly of upstream and downstream nozzle members which may be moved to vary the size of the throat of the nozzle, such movement of the nozzle members involving radial movement of the downstream ends of the downstream nozzle members, said upstream and downstream nozzle members being pivotally connected together at their downstream and upstream ends respectively, said upstream nozzle members being pivotally connected to the downstream end of said jet pipe, an assembly of radially movable pivotally mounted casing members within which the said nozzle members are mounted, tracks provided on said upstream nozzle members, rollers fixed to said casing members and cooperating with said tracks, further tracks provided at the downstream ends of said casing members, further rollers fixed to the downstream ends of said downstream nozzle members and cooperating with said further tracks, said tracks and rollers forming track and roller connections between the assemblies of nozzle members and casing members, whereby radially inward and outward movement of the downstream ends of the casing members is respectively accompanied by radially inward and outward movement of the nozzle members, and whereby axial movement of said casing members relative to said nozzle members is accommodated, power means for effecting axial movement of the casing members relative to the nozzle members, and cam means for camming said casing members towards and away from each other on axial movement of the casing members in an upstream and downstream direction respectively.

6. A jet engine provided with a convergent-divergent nozzle, a jet pipe, an assembly of upstream and downstream nozzle members which may be moved to vary the size of the throat of the nozzle, such movement of the nozzle members involving radial movement of the downstream ends of the downstream nozzle members, said upstream and downstream nozzle members being pivotally connected together at their downstream and upstream ends respectively, said upstream nozzle members being pivotally connected to the downstream end of said jet pipe, a nacelle having fixed and axially movable parts, an assembly of radially movable casing members within which the said nozzle members are mounted, said casing members being pivotally connected at their upstream ends to the downstream end of the axially movable part of said nacelle, and being axially movable therewith, track and roller connections between the assemblies of nozzle members and casing members, whereby radially inward and outward movement of the downstream ends of the casing members is respectively accompanied by radially inward and outward movement of the nozzle members, power means for effecting axial movement of the axially movable part of said nacelle and thus of said casing members, and cam and follower connections between said casing members and said jet pipe for camming said casing members towards and away from each other on axial movement of said casing members relative to said jet pipe.

7. A jet engine as claimed in claim 6, cam tracks being provided on said casing members, and rollers being provided to cooperate with said cam tracks, said rollers being pivotally connected to said jet pipe, the cam tracks and rollers constituting the cam and follower connections between said casing members and said jet pipe.

References Cited by the Examiner
UNITED STATES PATENTS

| | | | |
|---|---|---|---|
| 2,974,477 | 3/61 | Egbert et al. | 60—35.6 |
| 3,004,385 | 10/61 | Spears et al. | 60—35.6 |
| 3,068,644 | 12/62 | Worsham et al. | 60—35.6 |

FOREIGN PATENTS 839,230   6/60   Great Britain.

SAMUEL LEVINE, *Primary Examiner.*